United States Patent Office 3,306,044
Patented Feb. 28, 1967

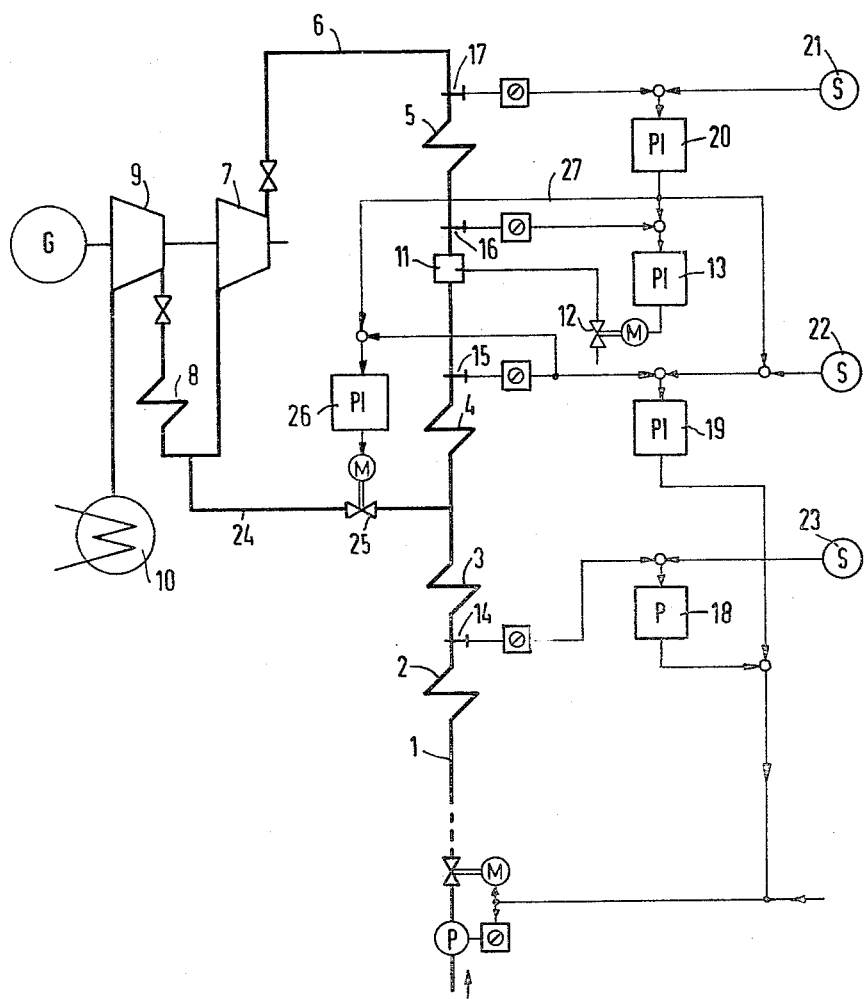

3,306,044
REGULATING SYSTEM FOR REDUCING THE EFFECT OF HEAT FLUCTUATIONS ON FORCED-FLOW STEAM BOILERS IN POWER PLANTS
Rupprecht Michel and Herbert Zwetz, both of Erlangen, Germany, assignors to Siemens-Schuckertwerke Aktiengesellschaft, Berlin-Siemensstadt, Germany, a German corporation
Filed Mar. 12, 1965, Ser. No. 439,380
Claims priority, application Germany, Mar. 14, 1964, S 90,024
7 Claims. (Cl. 60—107)

Our invention relates to a regulating system for forced-flow steam generators with intermediate superheater surfaces, in which, aside from the normally occurring fluctuations in calorific value and irregularities in supply of the fuel, there may occur appreciable heating disturbances, such as those resulting from failure of a coal grinder whose output is directly injected into the firing chamber. The heat supplied to the working medium may also greatly vary when the slag in the evaporator portion of the steam generator suddenly drops off in the evaporator portion of the boiler.

It is known and conventional for forced-flow boilers to regulate the fresh-steam temperature by desuperheating, namely by injecting a larger or smaller quantity of cooling water into the region of the superheater. In many cases, such a boiler operates with a continuous injection of approximately 5% of the total quantity of working medium, in which case the utilizable range of regulation, as a rule, is between 0 and 10%. Generally, the injection regulator serves only to correct the fresh-steam temperature, so that only the normally occurring fluctuations in heating value as well as ordinary irregularities in fuel supply are compensated by the temperature regulation resulting from the injection and, in the event of a change in load, the transition to the newly load condition to be regulated is facilitated. However, when larger disturbances in heat supply occur, this type of regulation makes it difficult to counteract the drop in hot-steam temperature. That is, with the above-described regulation by injection of water, the end of the regulating range is reached when the injection value has declined to zero. Consequently, for widening the regulating range the continuously injected quantity of water would have to be increased. Instead of continuously injecting approximately 5%, about twice or a still higher percentage of water would have to be injected.

It has indeed been attempted to operate forced-flow boilers with a higher continuous injection of cooling water. Then, however, the disadvantage of considerably increased requirements for high-quality tube material must be coped with. Furthermore, the larger injection quantity increases the losses inevitably accompanying the injection, and these losses then make themselves felt continuously during normal operation. It has also been attempted, for a smaller heating-up range of the end superheater, to operate with a second and third injection location. However, with more than one injection, there occurs during the regulating operation a temporary loss of some of the regulating range, so that in this case the total amount of injection must be made higher from the outset. Consequently, the above-mentioned disadvantages still remain effective.

It is an object of our invention to provide power plants having a forced-flow steam generator equipped with an intermediate superheater, with a regulating system capable of reducing the effect of considerable heating irregularities by a more economical regulating operation and over a wider range of regulating control than heretofore attained.

Generally, it has been attempted to reduce the above-mentioned disadvantages of the known regulating systems by limiting the drop in hot-steam temperature in forced-flow boilers on the principle of withdrawing a portion of the working medium directly from the forced flow in the event the working medium passing through the superheater suffers a drop in temperature. In such a system the fresh-steam temperature is kept within predetermined limits at the expense of fluctuations in temperature of the intermediate superheater. This leaves much to be desired in many cases because the regulating activity may occur more often than desirable and the stability of regulation is limited.

It is, therefore, also an object of our invention to secure a more satisfactory regulating performance of a regulating system for forced-flow boilers with an intermediate superheater while still employing the tap-line principle of the last-mentioned type.

According to our invention, we include the intermediate superheater of the steam-generating system into the regulation so that the drop of the hot-steam temperature becomes limited at the expense of the power generated in the high-pressure load of the system, such as in the high-pressure turbine supplied with steam from the forced-flow generator.

In accordance with a more specific feature of the invention, we supply to the intermediate superheater a partial current of superheated fresh steam taken from a tap in the superheater portion of the forced-flow steam generator, and we regulate the amount of superheated fresh steam, thus additionally supplied to the intermediate superheater, in dependence upon temperature so that the temperature in the intermediate superheater remains substantially constant and the predetermined fresh-steam temperature supplied to the high-pressure portion of the load is maintained by correspondingly reducing the power generation in that load, such as the high-pressure stage of the driven machinery.

The regulator for controlling the withdrawal of a partial flow of superheated steam from the superheater portion of the steam generator through the above-mentioned tap to the inlet of the intermediate superheater is preferably subject to control by a temperature sensor which furnishes a control signal in known manner only after the injection regulator has controlled the injection down to the zero value. Furthermore, the tap-steam regulator is also supplied with a datum or reference value which is varied in dependence upon the fresh steam temperature behind the superheater; and the same adjustable datum value is also applied to the injection-temperature regulator.

According to another feature of our invention, the supply of feed water into the forced-flow steam generator is corrected by means of correction signals supplied from the injection regulator as well as from the tap-steam regulator.

The invention will be further described with reference to an embodiment of a power plant with a regulating system according to the invention illustrated by way of example by the schematic diagram shown on the accompanying drawing.

The working medium in form of preferably preheated water enters at 1 through a controllable pump P and a feed-water control valve into the evaporator heating surface 2 of the illustrated once-through boiler. Evaporated medium passes through a pre-superheater 3 into an end superheater subdivided into two heating surfaces 4 and 5. A fresh-steam outlet line 6 leads from the superheater surface 5 to a high-pressure turbine 7 whose outlet is connected with the inlet of an intermediate superheater 8 from which the steam passes into the low-pressure turbine 9 of the plant and ultimately into condensator 10. The turbine assembly drives an electric generator G.

A water injector 11 is provided in the region of the final superheater, between the first superheater surface 4 and the second heating surface 5. The injector 11 is controlled by a valve 12 which in turn is actuated by an injection regulator 13 having a PI-characteristic. That is, the regulator 13 is a feedback control system of proportional integral control performance ("Feedback Control Systems," by Gille, Pelegrin and Decaulle, McGraw Hill Book Company Inc., 1959, page 772. Reference may also be had to the German Standards DIN 19226, of January 1959, page 11).

The temperature of the working medium is sensed by four sensors 14, 15, 16 and 17 at respectively different localities. The sensors are connected to four respective regulators 18, 19, 13 and 20 which are interconnected in cascade and form a feedback control system. The regulator 20 operates in dependence upon the temperature signal from the sensor 17 in the fresh-steam line and has a PI-characteristic. This regulator receives its datum value 21 as a given, adjusted value of the desired fresh-steam temperature. That is, the temperature sensed at the location 17 is compared with the reference temperature given by the sensor 21, and the difference or error value acts upon the PI-regulator 20 to produce a corresponding output signal.

This output signal is supplied as a variable datum or reference to the second control unit of the cascade, namely the regulator 13 which controls the injection control valve 12 for the injector 11. The regulator 13 also operates with PI-characteristic in response to the resultant of several input signals, of which one is the just-mentioned variable datum signal received from the regulator 20. The temperature values at the two measuring locations 15 and 16 ahead and arrear of the injector 11, as well as the datum value 22 for the difference in temperature ahead and arrear of the injection constitute the further input signals of the regulator 13. The temperature sensor 15 also controls the regulator 19, likewise having a PI-characteristic, which effects a correction of the feedwater supply by acting upon the pump P and upon the feedwater control valve. The temperature sensor 14 controls the regulator 18 which has a P-characteristic (proportional control; see the above-mentioned literature) and receives a datum value 23 for the temperature to be maintained at the measuring location 14 between the evaporator 2 and the pre-superheater 3. The regulator 18 also serves to control the feedwater supply.

A tap line 24 branches off the forced-flow main system at a point between the pre-superheater 3 and the first portion 4 of the final superheater. The branch line 24 contains a control valve 25 and leads to the inlet of the intermediate superheater 8. The valve 25 is controlled by a regulator 26 having PI-characteristic.

The controlled withdrawal of superheated steam through the line 24 into the intermediate superheater 8 has the effect of regulating the temperature at the sensor 15 ahead of the injector 11. The tap-off regulator 26 and the injection regulator 13 are always set to the same datum value. For this purpose the two regulators 26 and 13 are connected by a signal line 27 to the same datum source 22 which applies the same datum value to both regulators. In normal operation the datum value is lower than the actual (pilot) value sensed by the sensor 15 so that the regulator 26 remains inactive and the valve 25 remains unaffected or may only receive a command to close and remain closed. Only when the injector 11 is completely closed and the measuring points respond to further decline of the respective temperatures, does the tap-control valve 25 receive an opening command from regulator 26. Consequently, the system operates on the limit-value control principle but, in contrast to the limit-value control in the above-mentioned known system, the datum value is continuously varied in accordance with the instantaneous heating-up gradient stemming, for example, from soiling of the heating surfaces or from changes in load. This variation in datum value of control is continuously effected by the fresh-steam temperature regulator 20 as explained above.

This limit-value regulator thus constitutes a feedback control system whose forward path is constituted only by the superheater portion between the tap point of the steam withdrawing branch line 24 and the location of the injector 11. In other words, the forward path of the feedback control system is constituted substantially only by the first portion 4 of the end superheater. In this superheater portion there occurs an increase in temperature of about 100° C. This makes the forward path relatively short, a fact which greatly facilitates the regulating operation. With such a regulating system, virtually no attention need be given to stable behavior because the steam throughput is limited by the dimensioning of the withdrawal control valve 25 and because additionally any occurring over-regulation is made ineffective by intervention of the injection regulator 13. The entire opening time of the withdrawal control valve 25 is in the order of magnitude of the cycle period of the regulating oscillations, since the system also operates to adapt the throughput of working medium to the heating conditions. For this reason, too, a build-up of regulating oscillations or hunting need not be feared. Even if the regulator 26 should fail, the boiler operation is not endangered as long as the injection regulation continues to properly operate.

When the withdrawal control valve 25 is being opened, not only the temperature measured at the location of the sensor 15 ahead of the injection locality reacts very rapidly upon the valve-adjusting motion, but the fresh-steam temperature measured at the sensor locality 17 is likewise very rapidly influenced. This is due to the fact that the change in throughput initiated by the displacing motion of the withdrawal control valve 25 becomes immediately effective over the entire length of the superheater so that extremely short dead intervals result. Throttle losses in the withdrawal control valve 25 have no appreciable disadvantage because the opening of the valve 25 occurs always for a short interval of time and, besides, is limited to relatively rare disturbances.

We claim:

1. In a power plant comprising a forced-flow steam generator having a superheater portion, a high-pressure load connected to said superheater portion to receive fresh steam therefrom, and an intermediate superheater having an input connected to said high-pressure load to receive partly utilized steam therefrom, the combination of a system for regulating the steam generator to compensate for changes in heat supply, comprising a steam branch line additionally connecting the input of said intermediate superheater with a tap point of said superheater portion, said line having control means for varying the supply of steam from said tap point to said intermediate superheater, controllable water injector means disposed in said superheater portion, temperature sensor means in said superheater portion for providing signals substantially indicative of the fresh steam temperature, and regulator means comprising said sensor means to be controlled by said signals and connected to said injector means and said control means for controlling both to maintain the fresh steam temperature substantially constant while varying the power furnished to said high-pressure load.

2. In a power plant according to claim 1, said superheater portion of said forced-flow steam generator comprising serially successive pre-superheater and end-superheater ranges respectively, said injector means being situated in said end-superheater range, and said tap point being located substantially intermediate said two ranges.

3. In a power plant comprising a forced-flow steam generator having a superheater portion, a load having a high-pressure stage connected to said superheater portion to receive fresh steam therefrom, and an intermediate superheater having an input connected to said high-pressure stage to receive partly utilized steam therefrom, the combination of a system for regulating the steam generator relative to changes in heat supply, said system comprising a steam branch line additionally connecting the input of said intermediate superheater with a tap point of said superheater portion, said line having control means for varying the supply of steam from said point to said intermediate superheater, controllable water injector means disposed in said superheater portion, temperature sensors spaced from each other in and along said superheater portion and situated ahead and arrear respectively of said water injector means, one of said sensors being temperature-responsive to the fresh steam output of said superheater portion, a cascade of regulators having respective inputs connected to said sensors for regulatory response to departure of the sensed temperature from a given datum value, the first stage of said cascade being connected to said one sensor and having a regulated output connected to the next stage of the cascade to provide it with a variable datum value, said second stage being connected to the temperature difference between sensors ahead and arrear respectively of said injector means and being in controlling connection with said injector means and with said control means of said steam branch line for jointly actuating said injector means and said control means to maintain the fresh steam temperautre substantially constant while varying the power furnished to said high-pressure load stage.

4. In a power plant according to claim 3, said second stage of said regulator cascade comprising two regulating units having respective signal inputs connected in parallel and having outputs connected to said injector means and said control means respectively.

5. In a power plant according to claim 1, said forced-flow steam generator comprising feed-water supply control means, and said regulator means being connected to said latter control means for conjointly varying the feed-water supply.

6. In a power plant according to claim 3, said forced-flow steam generator comprising feed-water supply control means, and said regulator cascade having a last stage connected to said latter control means for corrective control of the feed-water supply.

7. In a power plant according to claim 1, said forced-flow steam generator comprising feed-water supply control means and said regulator means having two regulating units for said injector means and said branch-line control means respectively, said two regulating units having datum-value setting means in common and being connected to said feed-water control means for correctively controlling the feed-water supply by the operation of said two regulating units.

References Cited by the Examiner
UNITED STATES PATENTS
2,902,831   9/1959   Ipsen et al. _____ 60—73

MARTIN P. SCHWADRON, *Primary Examiner.*
ROBERT R. BUNEVICH, *Examiner.*